United States Patent [19]

Steffen

[11] 3,974,377
[45] Aug. 10, 1976

[54] SOLID STATE SEED SENSOR

[75] Inventor: David E. Steffen, Chatham, Ill.

[73] Assignee: Dickey-john Corporation, Auburn, Ill.

[22] Filed: Sept. 5, 1974

[21] Appl. No.: 503,459

Related U.S. Application Data

[63] Continuation-in-part of Ser. No. 326,254, Jan. 24, 1973, abandoned.

[52] U.S. Cl. ............................. 250/222 R; 250/227
[51] Int. Cl.² ......................................... G01D 21/04
[58] Field of Search ........... 250/221, 222, 223, 205, 250/227; 340/239; 221/7

[56] References Cited
UNITED STATES PATENTS

| | | | |
|---|---|---|---|
| 3,432,676 | 3/1969 | Lindberg ............................. | 250/227 |
| 3,452,209 | 6/1969 | Melkonjan .......................... | 250/221 |
| 3,537,091 | 10/1970 | Schenkenberg ................. | 250/223 R |
| 3,714,444 | 1/1973 | Carr et al ...................... | 250/222 PC |

OTHER PUBLICATIONS
"Improved Fiber Optic Read Head," Sokolski – IBM Tech. Journ. vol. 8, No. 11, Apr. 66, p. 1580.

Primary Examiner—Alfred E. Smith
Assistant Examiner—D. C. Nelms
Attorney, Agent, or Firm—Olson, Trexler, Wolters, Bushnell & Fosse, Ltd.

[57] ABSTRACT

The embodiment of the invention disclosed herein is directed to a solid state seed sensor which includes a light-emitting diode for directing a quantity of light to a pair of photoresponsive transistors. The light-emitting diode and photoresponsive transistors are maintained within a housing structure wherein all electronic components are mounted, such housing structure being formed of two halves with interconnection between circuit portions being accomplished through sealed passages formed through the housing halves. The light-emitting diode and associated resistor are maintained in one housing half while the remaining electronic circuitry, including the photoresponsive transistors, are maintained in the other housing half.

17 Claims, 8 Drawing Figures ic
3,974,377

SOLID STATE SEED SENSOR

REFERENCE TO RELATED APPLICATION

This is a continuation-in-part of application Ser. No. 326,254 filed Jan. 24, 1973, now abandoned.

BACKGROUND OF THE INVENTION

The present invention relates to a novel monitoring apparatus, and more specifically to a novel apparatus for monitoring the passage of discrete articles such as seeds or the like. While certain features of this invention may be adapted to many different uses, the disclosure will be directed to a seed monitoring structure and circuit.

As is well known in the art, a farmer engaged in mechanized planting of various seeds utilizes a planting machine pulled behind a tractor. Such planting machines usually include a plurality of separate planting devices supplied with seeds from separate hoppers so that a plurality of rows of seeds may be planted at one time. With planting equipment heretofore in general use, it has usually been difficult, if not impossible, for the farmer to determine the rate at which seeds are being planted during the actual planting operation, and there have been some instances where one or more of the planting units have failed to plant any seed at all due to a breakdown or temporary malfunction of the equipment. This lack of planting seeds or temporary breakdown usually happens without the farmer knowing of it.

One type of temporary malfunction which usually causes inoperativeness is when dirt and dust inherent in the ambient atmosphere around planting equipment accumulates around the sensing components. This most often happens when the relative humidity is low and static electricity causes a charge to develop within the interior surface of seed monitoring equipment so that large quantities of dust buildup occur.

SUMMARY OF THE INVENTION

Accordingly, it is an object of this invention to provide a new and improved seed monitoring structure and circuit which will operate over a wide range of adverse conditions.

Another object of this invention is to provide a new and improved seed monitoring structure and circuit which is inexpensive and simple to manufacture while still maintaining a high degree of reliability and efficiency when in use.

Still another object of this invention is to provide a new and improved seed monitoring apparatus and circuit which can utilize relatively delicate solid state electronic components in what may be considered a relatively rugged environment.

Briefly, the solid state seed sensor of this invention includes a light-emitting diode mounted in one half of a split housing with a pair of light responsive transistors mounted in the other half of the split housing. Associated electronic components of the light-emitting diode are maintained in a separate component receiving compartment of the associated housing half while electronic components for the photoresponsive transistors are maintained in its separate component compartment of the other half of the housing. Interconnection of the electronic components is accomplished by means of leads passing through isolated passages formed between the housing halves after the housing halves have been pre-assembled into a single unit. After this initial assembly condition a potting compound material may be placed over the electronic components within the component receiving compartments. To insure that the light-emitting diode and photoresponsive transistors are maintained in an operative condition for a long period of time a quantity of clear epoxy, preferably of a photo-optical grade, is applied over the components. This clear epoxy has a relatively low affinity for static electricity and therefore little or no dust buildup will result on days of relatively low humidity.

Many other objects, features, and advantages of this invention will be more fully realized and understood from the following detailed description when taken in conjunction with the accompanying drawings wherein like reference numerals throughout the various views of the drawings are intended to designate similar elements or components.

DETAILED DESCRIPTION OF THE ILLUSTRATED EMBODIMENT

Figure 1:
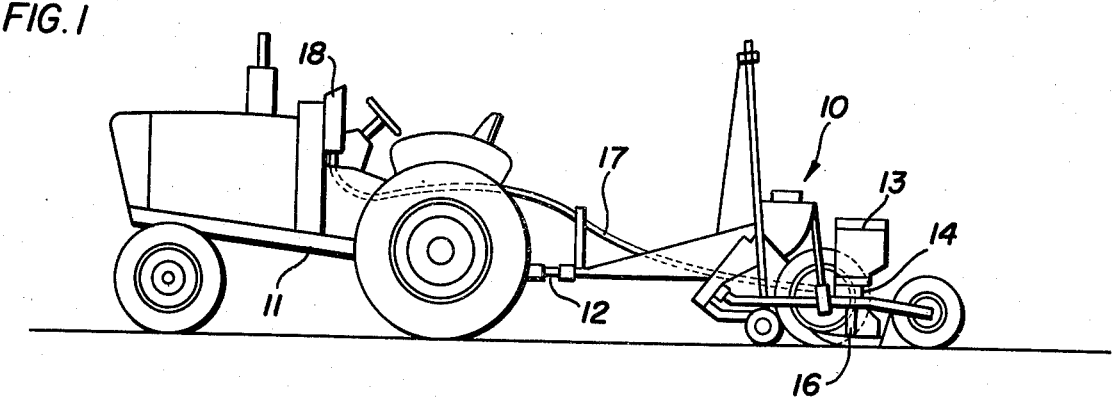
FIG. 1 is a diagrammatic representation of a seed planting machine and tractor power unit wherein the structure of the present invention is most advantageously utilized.

Referring now to the drawings, and particularly to FIG. 1, there is seen a seed planter designated generally by reference numeral 10, wherein the seed sensor of this invention is utilized. The seed planter 10 is arranged for transport over cultivated ground by means of a tractor 11 connected thereto by a tow bar 12. The seed planter 10 includes a hopper 13 which contains a quantity of seeds to be planted. A valve or feeding mechanism 14 allows the seeds to enter or pass through a seed sensor 16 which is constructed on accordance with the principles of this invention. The pulse output signals developed within the seed sensor 16 are delivered over a cable 17 to a visual readout monitor 18 located at the tractor. This allows the farmer to more readily determine whether or not the particular seed planter is working.

Figure 2:
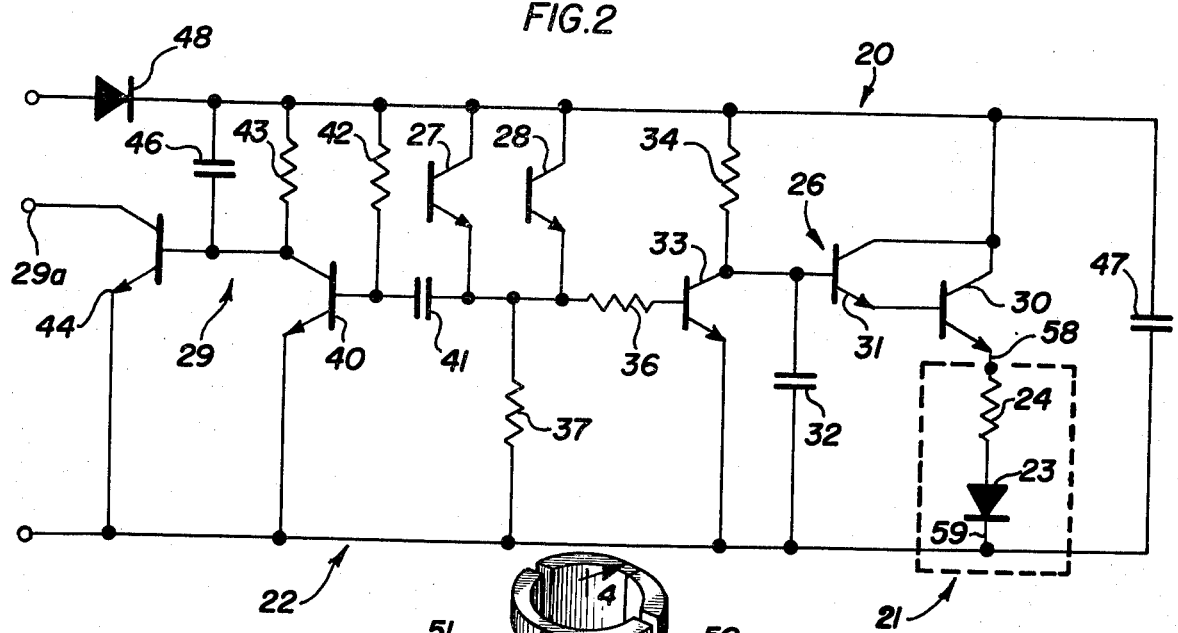
FIG. 2 is a detailed schematic diagram of the solid state seed sensor of this invention.

Referring now to FIG. 2 a detailed schematic diagram of the present invention is illustrated. Here the seed planter circuit is designated generally by reference numeral 20 and is formed of two circuit portions 21 and 22 arranged for physical separation but electrical connection with one another. The circuit portion 21 comprises a light-emitting diode 23 connected in series with its associated current limiting resistor 24. The current limiting resistor 24 may be of a relatively low resistance value but high wattage rating, as for example, a 100 ohm 1 watt resistor which is a relatively large component. The remaining resistor components within the circuit portion 22 preferably are of the ¼ watt rating which may be relatively small components. The heat buildup of resistor 24, while being of a relatively small quantity in relative terms, may be sufficient to affect the remaining circuit. Also the space limitation of the circuit portion 22 may be limited. Therefore, physical separation of the resistor 24 and its light-emitting diode is accomplished by placing them in their own component receiving compartment in the sensor housing.

To control the amount of current passing through the light-emitting diode which, in turn, controls the light intensity, a current control circuit 26 is connected thereto and arranged for receiving pulse signal information from a pair of parallel connected photoresponsive transistors 27 and 28. The pulse signals from the photoresponsive transistors 27 and 28 are also delivered to a pulse output circuit 29 which delivers a count output pulse at the output terminal 29a. Therefore, the pulse signals from either one or both of the parallel connected photoresponsive transistors 27 or 28 will produce, on the one hand, a continuous variable control signal through the current control circuit 26 to control the current through the light-emitting diode, and on the other hand, produce a pulse signal output through the pulse output circuit 29 and its associated output terminal 29a.

More particularly, the current control circuit 26 comprises a pair of interconnected transistors 30 and 31 and an associated pulse receiving capacitor 32 connected to the base electrode of transistor 31. The pulse signal from the photoresponsive transistor is amplified by means of a transistor 33 connected in series with a load developing resistor 34. The transistor 33 receives its biasing voltage by means of a pair of resistors 36 and 37 connected to the output of the photoresponsive transistors. Under normal conditions, i.e., a balanced circuit for initial startup, the voltage developed across resistor 37 is approximately 0.8 volts. Pulse signal information developed across the resistor 37 is amplified and filtered through capacitor 32 to continuously control the current density through the light-emitting diode 23.

The pulse signal information applied to the pulse output circuit 29 is delivered to a transistor 40 through a coupling capacitor 41. The base electrode of transistor 40 is biased through a resistor 42 while the collector electrode thereof includes a resistor 43. The output pulse of transistor 40 is delivered to a second transistor 44 which has a capacitor 46 connected to the base electrode thereof. Power is applied to the entire circuit through a diode 48, which insures inadvertent reversal of polarity, and a relatively large filter capacitor 47 substantially reduces or eliminates the effects of transient voltages.

In operation, relatively high velocity seeds, which travel in the order of 27 miles per hour, are delivered through the sensor 16 so that the photoresponsive transistors 27 and 28 will produce a pulse output as they pass therethrough. The light-emitting diode 23 is an infrared solid state device, it being understood that other types of light-emitting diodes may be used. The current flow through the light-emitting diode is controlled as a result of the current control circuit 26 which initially biases the diode to a predetermined conductive state, that is, the value of resistors 24, 34, 36, and 37, as well as the transistors 30, 31, and 33 and their associated capacitor 32 are selected so that the output of the photoresponsive transistors 27 and 28 maintains a voltage value of approximately 0.8 volts, across resistor 37. If the voltage rises much above 0.8 volts transistor 33 tends towards a saturation condition thereby lowering the voltage to the current limiting resistor 24 which, in turn, lowers the output light intensity from the light-emitting diode 23. This in turn lowers the output to the photoresponsive transistors which brings the voltage across resistor 37 down towards the 0.8 volt value again. If the voltage across resistor 37 is much below 0.8 volts just the reverse action takes place and current through the resistor 24 tends to increase the light intensity from the light-emitting diode 23.

When a seed passes between the light-emitting diode and its associated photoresponsive transistors the total current output of the photoresponsive transistors decreases because of the decrease in light intensity. This decrease in current causes a decrease in the voltage across resistor 37. The decrease in voltage produces a pulse to be coupled across capacitor 41 to the base electrode of transistor 40 temporarily turning it off. This in turn allows transistor 44 to be rendered conductive thereby generating an output pulse signal at the terminal 29a.

Capacitor 32 prohibits the control circuit 26 from responding to short duration light level changes, such as seeds, whereas it allows continuous variable compensation for gradual changes in light level, such as that produced by dirt of other substances accumulating on the photoresponsive transistors or on the surface of the light-emitting diode. The capacitor 32 in the current control circuit 26 also prevents high frequency oscillations from affecting the circuit. The current limiting resistor 36 is not only used to control the amount of current delivered to the base electrode of transistor 33 but is also used to control the conductive rate of transistor 33 to discharge capacitor 32 in a self-regulatory function. In the preferred embodiment the value of capacitor 32 may be in the order of 47 mfd. having a voltage rating of 15 volts plus or minus 20 percent. On the other hand, the coupling capacitor 41 preferably has a value of 2.2 mfd. and a voltage rating of 20 volts plus or minus 20 percent. Capacitor 45 is in the order of 0.01 mfd., thereby being many times smaller than capacitor 41, and thus allowing transistor 44 to be rendered conductive only for a short perior of time to produce a desired output pulse configuration.

Figure 3:
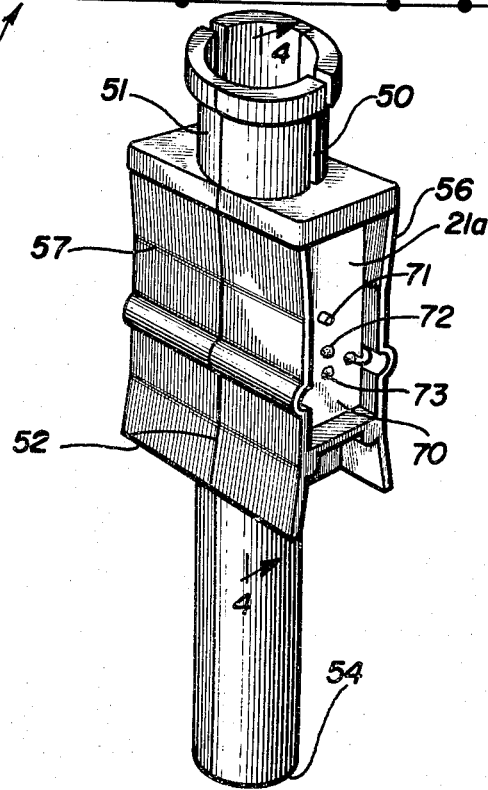
FIG. 3 is a perspective view showing the structural configuration of the solid state seed sensor of this invention.

Referring now to FIG. 3 a perspective view of the housing of the solid state seed sensor 16 is shown. Here the seed sensor 16 is formed of first and second housing halves 50 and 51 joined together as indicated by a parting line 52. The two housing halves 50 and 51 may be joined together by any suitable means such as plastic welding, epoxy adhesives, and the like. The solid state sensor unit has an inlet 53 for connection to a hose or other conduit means which propels the seed therethrough, under pressure. At the bottom of the sensor is an outlet 54 which has a relatively long nozzle structure to be placed close to the ground so that the seed will be directed accurately into the furrow formed thereunder.

The housing half 50 has a first component receiving compartment 56 while the housing half of 51 has a second component receiving compartment 57. In the illustrated embodiment the circuit portion 21, including the light-emitting diode 23 and resistor 24, are inserted into the component receiving housing 56. On the other hand, the electronic circuit portion 22, which may be mounted on a circuit board, is inserted into the second receiving housing 56. The interconnection between the resistor 24 and diode 23 is accomplished by leads 58 and 59, as seen in FIG. 2, through confined passages between the secured together housing halves. Therefore, the relativley high rated resistor 24, which may emit some heat, is physically isolated from the rest of the circuit.

Figure 4:
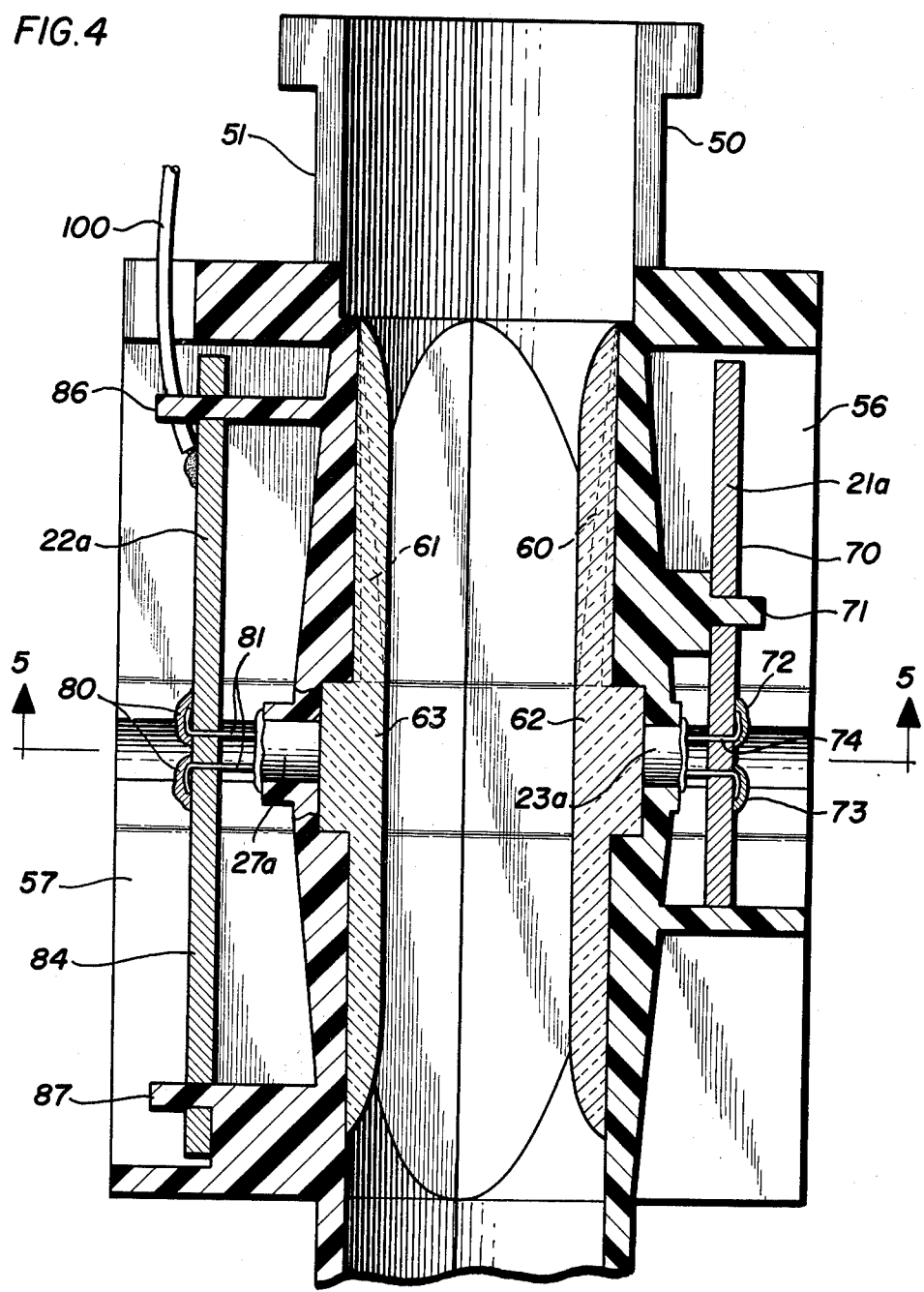
FIG. 4 is a vertical sectional view taken along 4—4 of FIG. 3.
Figure 5:
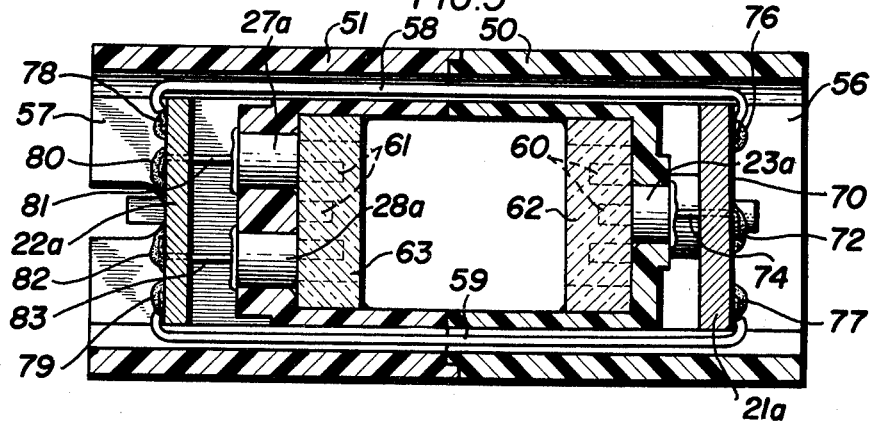
FIG. 5 is a horizontal sectional view taken along 5—5 of FIG. 4.

As best seen in FIGS. 4 and 5 the interior surface of the seed sensor 16 is provided with a plurality of longitudinal ribs 60 and 61 associated with the respective housing halves 50 and 51. The ribs extend outwardly of the end surfaces of the associated light-emitting diode 23a and photoresponsive transistors 27a and 28a. Therefore passage of seeds through the housing structure will not impinge upon the electronic components mounted therein.

It has been discovered that large quantities of dust and other particulate matter tend to accumulate within the seed sensor during days of low relative humidity. To substantially reduce this effect a quantity of optically transparent epoxy material 62 is applied over the ribs 60 and the light-emitting diode 32 while a quantity of optically transparent epoxy material 63 is applied over the ribs 61 and the photoresponsive transistors 27a and 28a. This clear epoxy material defines wall surface portions positioned to be wiped by passing seeds to remove any dust or dirt thereon to prevent accumulation of dust and dirt and the like between the light-emitting diode and the photoresponsive transistor.

The circuit portion 21a is formed on a circuit board 70 which is mounted in the component receiving compartment 56 by means of a standoff pin 71 which may serve as a rivet. The extent to which the board 70 is spaced from the light-emitting diode 23a determines the length of leads 74 extending therefrom. The leads are inserted through the circuit board 70 and turned over at 73 and soldered, as indicated by reference numeral 72. This provides a sturdy solder connection to the circuit board without requiring additional wire. As best seen in FIG. 5 the conductors 58 and 59 pass through the passages between the molded body halves and are at no time exposed to the exterior of the seed sensor housing. The lead 58 is connected at its ends by solder connections 76 and 78 while the lead 59 is connected at its end by solder connections 77 and 79.

The printed circuit portion 22a is mounted on a circuit board 84 which is held in place by a pair of standoff members 86 and 87 which may serve as rivet-like members. The light-responsive transistors 27a and 28a have their leads 81 and 83, respectively, extending towards the printed circuit board 84, inserted therethrough, and bent over, as seen in FIG. 5. The leads are soldered to the circuit as shown by reference numerals 80 and 82. Therefore, the entire circuit, including the two circuit portions 21 and 22 is completely wired together between the two housing halves and only a single conductor 100 extends from the circuit and housing. The conductor 100 is connected to the output terminal 29a, of FIG. 2, to direct pulse signal information to a decoder and readout unit mounted on the tractor.

Figure 8:
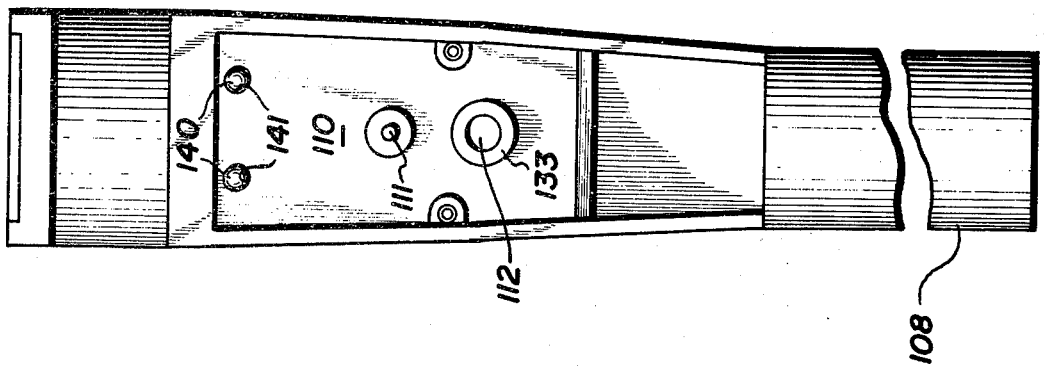
FIG. 8 is an opposite end view of the dispensing nozzle shown in FIG. 6.
Figure 7:
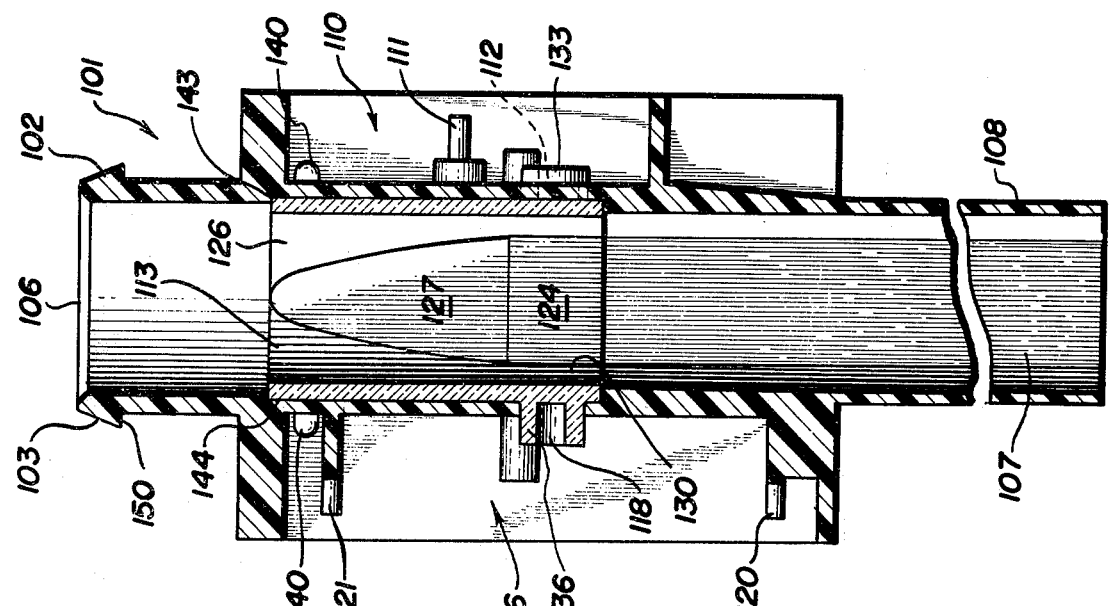
FIG. 7 is a sectional view taken along line 7—7 in FIG. 6.
Figure 6:
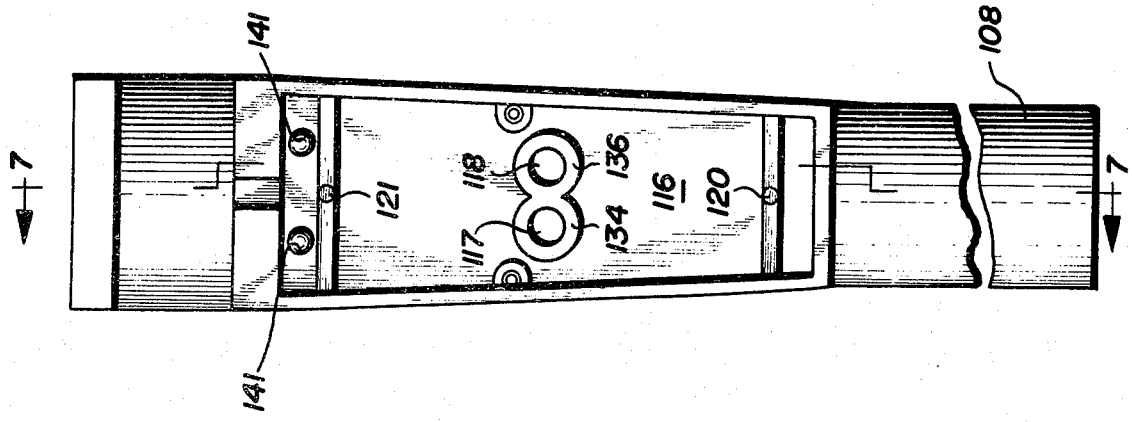
FIG. 6 is an end view of an alternate embodiment of a seed dispensing nozzle constructed in accordance with the principles of the invention.

Referring now to FIGS. 6, 7 and 8 there is seen an alternate embodiment of a housing for the solid state seed sensor of this invention. Here the housing is designated generally by reference numeral 101 and includes a pair of housing halves 102 and 103 molded from an opaque plastic material. The housing halves 102 and 103 are joined together along a parting line 104 by any suitable means such as plastic welding, epoxy adhesives, and the like. The seed-dispensing housing 101 has an inlet 106 arranged for connection to a hose or other suitable conduit means through which is propelled seeds under pressure. The seeds then pass through the seed sensing housing and are detected by the light-responsive seed sensor mounted therein. At the bottom of the seed-dispensing housing 101 is an outlet 107 which is formed of a relatively long nozzle structure 108, here shown broken away for convenience.

The housing half 101 is provided with a component receiving compartment 110. As mentioned above, the circuit portion 21, including the light-emitting diode 23 and the resistor 24, are inserted into the component receiving compartment 110 and secured therein by a mounting post 111. The light-emitting diode is positioned to be in registry with a window 112 to deliver a light beam through the seed-dispensing housing 101.

The housing portion 103 is provided with a component receiving compartment 116 which receives the remainder of the circuit components, including the pair of light-responsive transistors 27 and 28. The light-responsive transistors 27 and 28 are placed in registry with a pair of windows 117 and 118 to receive the light beam from the light-emitting diode 23 in registry with the window 112. The circuit portions 22 secured to the component receiving board 22a are held in position in the housing 116 by a pair of plastic support studs 120 and 121 which are inserted into apertures formed in the circuit board 22a and then deformed either by pressure or heat or both.

In accordance with this embodiment of the invention, production and assembly of the sensor is facilitated by making the windows 112, 117 and 118 as part of a clear plastic premolded insert 113. The insert 113 has the opposed wall portions arranged to be wiped by seeds passing therethrough. This action will maintain the windows free of dirt and dust. The insert 113 has the upper end 126 thereof substantially cylindrical in configuration and a pair of diametrically opposed, spaced apart and downwardly converging flat wall portions 127 leading into the focusing area 124. The focusing area 124 is substantially rectangular in configuration with end wall portions 130 and 131 having the windows 112 and 117, 118 formed therein. The insert 113 has an annular flange 133 formed about the window 112 so that the light-emitting diode 23a can be inserted therein. Similarly, a pair of annular flanges 134 and 136 are formed about the windows 117 and 118, respectively, to receive the light-responsive transistors 27a and 28a.

To facilitate alignment and assembly of the insert 113 with respect to the housing halves 102 and 103, protuberances 140 are formed on the insert 113 and are placed into correspondingly positioned apertures 141 formed in the housing halves 102 and 103. This will hold the insert 113 is proper alignment while the housing halves 102 and 103 are secured together.

As the seeds are dispensed through the nozzle 101, the end wall portions 130 and 131 of the clear plastic insert 113 are continuously wiped to maintain the window portions thereof free of dirt and dust. This insures that the light energy produced by the light-emitting diode 23a will, at all times, be received by the light-responsive transistors 27a and 28a.

In the illustrated embodiment the insert 113 is dimensioned to fit within recesses 143 and 144 formed within the housing halves 102 and 103, respectively. The recesses 143 and 144 provide an annular lock about the insert 112 when the housing halves are secured together. Also in the illustrated embodiment of FIGS. 6, 7 and 8 the inlet 106 is provided with a flange 150 to facilitate gripping of the rubber hose or conduit secured thereto.

While a specific embodiment of the invention has been disclosed herein it will be understood that suitable variations and modifications may be effected without departing from the spirit and scope of the novel concepts disclosed and claimed herein.

The invention is claimed as follows:

1. A seed sensor comprising: first and second housing halves secured together to form means for supporting electronic components and providing a passage for seeds to be sensed, a light source secured in said first housing half and arranged for directing its light across said seed passage toward said second housing half, light responsive means mounted in said second housing half and arranged for receiving light from said light source, longitudinal ribs formed within the interior of each of said housing halves and adjacent said light source and said light responsive means, said ribs extending into the seed passage a distance greater than said light source and said light responsive means to prevent impingement of seeds thereon, a component receiving compartment formed in said first housing half for receiving circuit components connected to said light source, a second component receiving compartment formed in said second housing half for receiving electronic circuit components connected to said light responsive means, and passage means formed between said first and second component receiving compartments and passing through said first and second housing halves for interconnecting the electronic components secured in said first and second component receiving compartments.

2. The seed sensor according to claim 1, wherein said light source is a light-emitting diode and said light-responsive means includes a pair of photoresponsive transistors.

3. The seed sensor according to claim 1, further including a quantity of clear epoxy over said light source and a separate quantity of clear epoxy over said light-responsive means, with each said quantity of epoxy substantially grippingly secured in place by the corresponding ones of said ribs.

4. The seed sensor according to claim 1, wherein a quantity of optical grade clear epoxy is formed over said light source a separate quantity of optical grade clear epoxy is formed over said light-responsive means to substantially reduce the amount of static charge formed within the seed passage correspondingly to reduce the amount of dust accumulated as a result thereof.

5. The seed sensor according to claim 1, further including a circuit board mounted in each of said component receiving compartments, said light source and said light-responsive means including electrical leads extending rearwardly therefrom and into said component receiving compartments, the extent of said electrical leads being selected to pass into said circuit board for electrical connection to the electronic components mounted thereon.

6. A seed sensor comprising: housing means providing a passageway therethrough for seeds and the like, a light source mounted at one side of said passageway, photo-responsive means mounted adjacent said passageway in substantial opposition to said light source so that the passage of seeds past said light source will cause said responsive means to provide a signal, and light transmitting means at least covering said light source and said responsive means and at least defining opposed liner wall portions of said passageway and positioned to be wiped by seeds passing therebetween to prevent accumulation of dust and the like between the light source and the responsive means, said light-transmitting means and said opposed liner wall portions are formed of an integral unit of clear plastic material inserted into said housing means.

7. The seed sensor as set forth in claim 6 wherein said integral unit of clear plastic material has converging wall portions substantially perpendicular to said opposed liner wall portions to provide a focusing path for the seeds passing therethrough, thereby insuring that all seeds pass between the light source and said photo-responsive means.

8. The seed sensor as set forth in claim 6 wherein said integral unit of clear plastic material has an annular flange formed on one of said opposed liner wall portions to define a window, said light source being positioned within said housing to be in register with said window, said integral unit of clear plastic material including a pair of annular flanges on the other of said opposed liner wall portions to define a pair of windows, and wherein said photo-responsive means includes a pair of photo-transistors placed in register with said pair of windows.

9. A seed sensor comprising: first and second housing halves secured together to form means for supporting electronic components and providing a passage for seeds therethrough, a clear plastic insert positioned within said housing halves and held in place thereby, said clear plastic insert having opposed liner wall portions providing diametrically opposed window areas to be wiped by seeds passing therethrough, a light source mounted within said housing to be in register with one of said window areas, light-responsive means mounted within said housing to be in register with the other of said window areas, whereby the passage of seeds through said clear plastic insert will interrupt the light from said light source to produce a pulse signal from said light-responsive means.

10. The seed sensor as set forth in claim 9 wherein said clear plastic insert further includes converging wall portions substantially perpendicular to said opposed liner wall portions to focus seeds passing therethrough to be in register with the light from said light source.

11. The seed sensor as set forth in claim 9 wherein a component receiving compartment is formed in said first housing half for receiving components connected in circuit to said light source, and a second component receiving compartment is formed in said second housing half to receive electronic components connected in circuit with said light-responsive means, and passage means formed between said first and second component receiving compartments and passing through said first and second housing halves for interconnection of electronic components mounted within said first and second component receiving compartments.

12. A housing assembly for a sensor of the type particularly adapted for use in a system which uses a predetermined type of radiated energy to monitor the flow of seeds through a passageway comprising: an insert member pre-molded from a material which transmits said radiation and having opposed inner wall surfaces which define a first seed passageway and which are positioned to be contacted by said seeds, said insert member having a radiation-source locating means adjacent to one of said wall surfaces for positioning a radiation source at a predetermined location with respect to said first seed passageway and a radiation-sensor locating means adjacent to said other wall surface and in substantial alignment with said radiation-source locating means for positioning a radiation sensor at a location suitable for receiving radiation from a radiation source at said predetermined location through said first seed passageway; an opaque outer housing member having opposed inner wall surfaces which define a second seed passageway, said outer housing member having a recess in said second seed passageway for receiving said insert member with said first and second seed passageways in general alignement, said outer housing member further having a radiation-source window in said recess in register with said radiation-source locating means and a radiation-sensor window in said recess in register with said radiation-sensor locating means, whereby the housing assembly provides for automatic alignment of a radiation source and radiation sensor so that a predetermined type of energy may be radiated from the source across the seed passageway to the sensor without interference caused by stray or ambient radiation such that the passage of seeds through the continuous passageway interrupts the radiated energy to thus generate a signal which may be utilized to detect the flow of seeds through the passageway.

13. A housing assembly for a seed sensor of the type particularly adapted for use in a system which optically monitors seeds as they are being dispensed for planting, said housing assembly comprising: an insert member pre-molded from light-transmissive material and having opposed inner wall surfaces which define a first seed passageway and which are positioned to be wiped by the passage of seeds therethrough, said insert member having a light-source locating means adjacent to one of said wall surfaces for positioning a light source at a predetermined location with respect to said first seed passageway and a light-sensor locating means adjacent to said other wall surface and in substantial alignment with said light-source locating means for positioning a light sensor at a location suitable for receiving light from said light source through said first seed passageway; an opaque outer housing member having opposed inner wall surfaces which define a second seed passageway, said outer housing member in said second seed passageway having a recess for receiving said insert member with said first and second seed passageways in general alignment to form a continuous seed passageway, said outer housing member further having a light-source window in said recess in register with said light-source locating means and a light-sensor window in said recess in register with said light-sensor locating means, whereby the housing assembly provides for automatic alignment of a light source and light sensor so that a beam of light may be projected from the light source across the seed passageway to the light sensor without interference caused by stray or ambient light such that the passage of seeds through the continuous passageway interrupts the light beam to thus generate a signal which may be utilized to detect the number of seeds passing through the passageway.

14. A housing in accordance with claim 13, in which each of said locating means comprises an annular flange.

15. A housing in accordance with claim 13, in which said opposed wall surfaces of said insert member are sloped inwardly to narrow said first passageway near said predetermined location, whereby the seed flow is focussed at the point in the passageway where the light beam intersects it to facilitate seed detection.

16. A housing in accordance with claim 13, in which said outer housing member has an outer wall surface adjacent said recess with each said outer wall surface having a compartment therein which is adapted to receive circuit components therein, said outer housing member further having an interior passage between said compartments which is adapted for receiving wires to connect circuit components in one compartment with circuit components in the other compartment.

17. A housing in accordance with claim 13, in which said light-transmissive material comprises optical grade clear epoxy.

* * * * *